June 12, 1962 J. L. E. MORELLE 3,038,399
AUTOMATIC DIAPHRAGM CONTROL FOR CAMERAS
Filed June 24, 1959
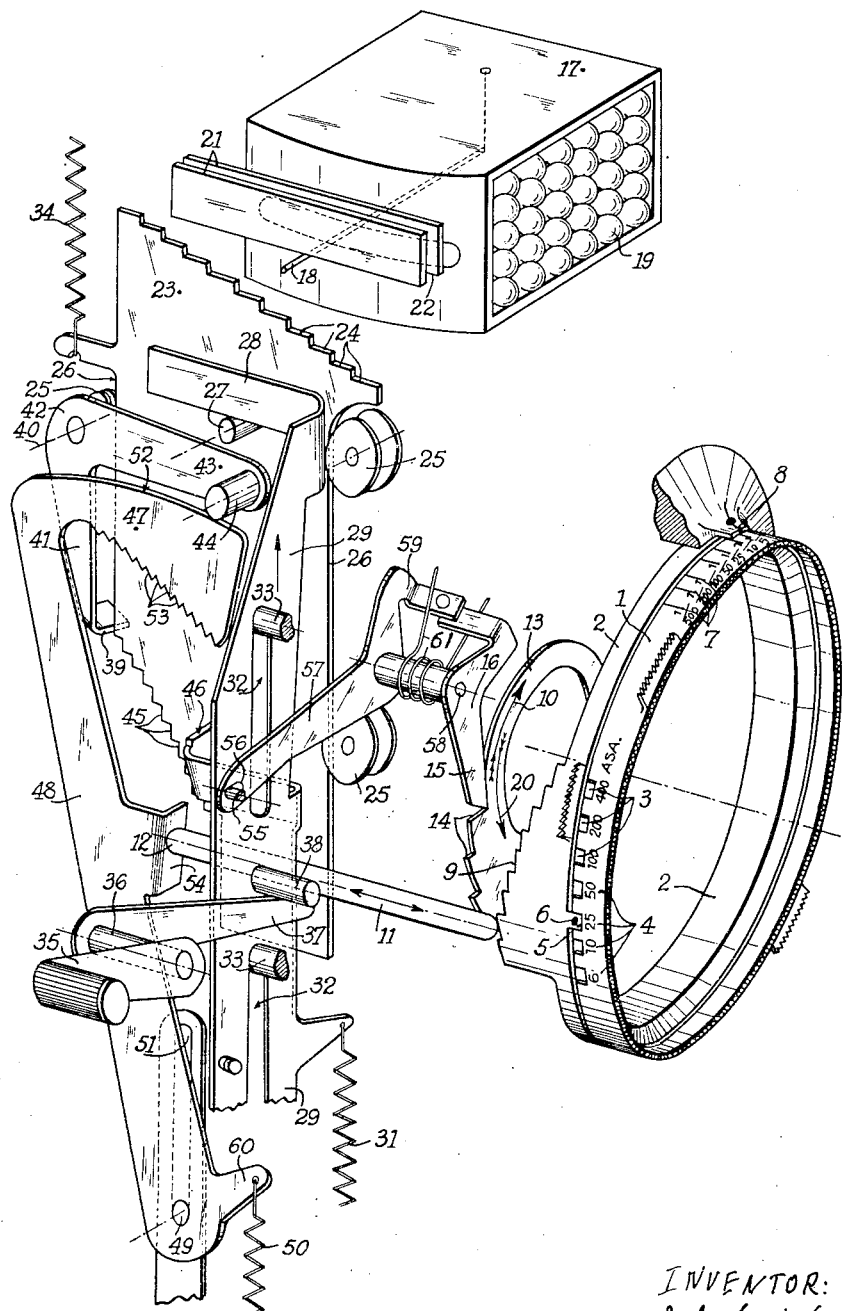
INVENTOR:
Jules Louis Eugene
 Morelle
by Michael S. Striker
 Attorney

United States Patent Office 3,038,399
Patented June 12, 1962

3,038,399
AUTOMATIC DIAPHRAGM CONTROL
FOR CAMERAS
Jules Louis Eugene Morelle, Paris, France, assignor to Optique et Precision de Levallois, Levallois-Perret, Seine, France, a company of France
Filed June 24, 1959, Ser. No. 822,595
Claims priority, application France July 10, 1958
6 Claims. (Cl. 95—10)

The present invention relates to cameras.

More particularly, the present invention relates to a device for automatically determining the diaphragm aperture of a camera.

In present day cameras it is conventional to provide exposure meters and interlocking of various of the camera setting rings in such a way as to provide automatically the proper exposure of the film. However, the solutions to this problem are not yet entirely satisfactory. Thus, where a device such as an exposure meter is incorporated into the camera itself, the exposure meter is necessarily of an extremely small size and therefore its sensitivity to the light is effective only over a rather limited range so that it is not possible to provide the desired accuracy of setting in an automatic manner over the entire range of exposure times which can be set into a camera, for example. Furthermore, where the structure for determining the settings is primarily electrical, this structure is extremely sensitive and does not operate over a long period of time with the required efficiency.

It is an object of the present invention to overcome the above drawbacks by providing a structure which will automatically set the aperture of the camera throughout a large range of exposure times even though a relatively small exposure meter is incorporated into the camera.

Another object of the present invention is to provide an automatic setting structure for a camera, this setting structure being mechanical rather than electrical so that it does not include any extremely sensitive elements which will not operate reliably over a long period of time.

It is also an object of the present invention to provide a structure of the above type which is simple and inexpensive and which at the same time is rugged and capable of operating reliably over a long period of time.

With the above objects in view the invention includes in a camera which has a means for setting a selected exposure time into the camera, a means for setting a selected film sensitivity into the camera, and a means for measuring the light received by the camera, a control means for determining the diaphragm aperture of the camera. This latter control means is supported by a suitable support means for movement along a first path, and the location of the control means along this first path will determine the size of the diaphragm aperture. A moving means cooperates with the control means for moving the latter along this first path, and this moving means includes a control portion which moves along a second path during movement of the control means along the first path. In accordance with the present invention a limiting means automatically cooperates with the control portion of the moving means to limit the movement of this control portion along the above second path according to the amount of light received by the camera as well as according to the exposure time and film sensitivity set into the camera, so that this limiting means will automatically stop the movement of the control portion of the moving means along the above second path at a location which will place the control means which determines the diaphragm aperture along the first path at a location providing the proper diaphragm aperture.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawing, in which there is shown in a perspective and partly diagrammatic view one possible embodiment of a structure according to the present invention.

Referring now to the drawing, it will be seen that the structure illustrated therein includes a manually turnable ring 1 of the objective assembly only part of which is shown in the drawing. The drawing shows only enough structure to afford a complete understanding for the invention, and all of the other additional conventional structure of the camera is not illustrated for the sake of clarity. The ring 1 is manually turned by the operator in order to set the exposure time into the camera. It will be noted that the exposure time indicia 7 carried by the ring 1 cooperates with a stationary index 8 so that in this way the operator turns the ring 1 to a selected angular position for setting a desired exposure time into the camera, and the angular position of the ring 1 will control the speed of operation of the shutter in a known way.

This ring 1 is formed along its periphery with a plurality of notches 3 which are adapted to selectively receive a projection 5 of a second ring 2 which is coaxial with the ring 1. The ring 1 carries in alignment with the several notches 3 the indicia 4 indicating various exposure indexes, so that by placing the tooth 5 in a selected one of the notches 3 the angular position of the rings 1 and 2 with respect to each other may be regulated in accordance with the particular sensitivity of the film which is used in the camera. The projection 5 is provided with an index 6 for easy identification, and an unillustrated spring means urges the rings 1 and 2 into the illustrated position where the projection 5 extends into a selected one of the notches 3 according to the particular exposure index of the film which is used.

It will be seen that the left peripheral edge of the ring 2, as viewed in the drawing, is provided with a stepped portion 9, and a motion transmitting pin 11 is supported by a suitable unillustrated bearing for horizontal movement back and forth in a direction parallel to the optical axis with the right end of the pin 11, as viewed in the drawing, always bearing against the stepped edge 9 at the rear of the ring 2. It will be noted that the successive steps of the edge 9 are located at different positions along the optical axis, so that the axial position of the pin 11 will be determined by the angular position of the ring 2, and the angular position of the ring 2 will be determined on the one hand by the film sensitivity which is set into the camera by placing the projection 5 in a selected notch 3 and on the other hand by the exposure time which is set into the camera by placing a selected one of the indicia 7 in alignment with the index 8. Thus, the rings 1 and 2 form a means for setting the exposure time and film sensitivity, respectively, into the camera, and through the stepped edge 9 and the pin 11 the setting of these fatcors into the camera is transmitted into the setting mechanism which is illustrated in the drawings for a purpose described below. The indicia 4 and 7 form a pair of logarithmic scales, so that the turning ring 2 will have displacements equal to the sum of the angular displacements corresponding to the product of shutter speed and sensitivity index expressed in proportional numbers, for example, in A.S.A. indices. Also, the rings 1 and 2 are resiliently urged toward each other to the position illustrated by an unillustrated spring means which is well known.

In the illustrated example, the structure is adapted to be used in a single lens reflex camera where the subject is viewed through the diaphragm, so that the diaphragm is maintained in its fully open position until an exposure is made. The diaphragm itself is not illustrated since it is conventional and well known. The diaphragm is operated by a ring 13 shown in the drawings, and just before an exposure is made the ring 13 is turned in the direction of the arrow 10 so as to reduce the size of the aperture of the diaphragm, and the structure of the invention automatically terminates the turning of the ring 13 in the direction of the arrow 10 in order to locate the diaphragm in the position providing the proper aperture for the particular lighting conditions as well as for the particular exposure time and film sensitivity which have been set into the camera. After an exposure is made the ring 13 turns back to its rest position in the direction of the arrow 20 in order to again locate the diaphragm in its fully open position so that the subject can be viewed through the fully open diaphragm. The structure of the diaphragm as well as the structure which moves the ring 13 in the direction of the arrow 10 as well as in the direction of the arrow 20 are all well known and form no part of the present invention, and this structure has been omitted so as to present the structure of the invention in the clearest possible manner. A structure suitable for this purpose is shown in U.S. patent 2,124,886.

The ring 13 is thus a diaphragm controlling member, and it is provided at its periphery with a plurality of steps 14 which are circumferentially distributed about the optical axis and which are successively located at greater radial distances from the optical axis. As the ring 13 turns in the direction of the arrow 10 just prior to an exposure so as to properly locate the diaphragm to provide the proper aperture, the stepped portion 14 will also turn, and depending upon the angular position of the pawl 15 shown in the drawing, one of the steps 14 will engage this pawl 15 so as to terminate the turning of the ring 13 in the direction of the arrow 10 and thus provide an aperture of the proper size. It is apparent, therefore, that the pawl 15 is a control means which will determine the diaphragm aperture of the camera in accordance with the angular position of this control means. The pawl or control means 15 is supported by a suitable support means for movement along a predetermined path which in the illustrated example is circular. Thus, it will be seen that a stationary pin 58 pivotally supports the pawl 15 for turning movement around an axis which is parallel to the optical axis, and it is the angular position of the pawl 15 which determines the aperture. The pawl 15 has a central portion 16 which is connected to the pivot 58 so as to be turnable with respect to the latter.

A moving means is provided for moving the pawl 15 along the circular path, and this moving means includes a vertically movable slide member 29 formed with elongated slots 32 through which stationary pins 33 extend, so that through this pin and slot mounting the slide member 29 is supported for vertical movement, as viewed in the drawing. The slide member 29 is moved vertically, in the illustrated example, by the operator. Thus, a lever 35 is accessible to the operator and is fixed to a shaft 36 which is supported for rotation about its axis by an unillustrated bearing, and the shaft 36 is fixed in turn to a lever 37 which engages a pin 38 fixed to the slide 29, so that when the operator turns the lever 35 downwardly the lever 37 will move upwardly and thus cause the slide 29 to move upwardly also. This slide 29 in addition carries a pin 55 extending into a slot 56 which is formed in a bell crank 59 which is also turnably supported by the stationary pivot 58, and this bell crank 59 has a lug located over a lug of the pawl 15, so that when, during upward movement of the slide 29 by the operator, the bell crank 59 turns in a clockwise direction, as viewed in the drawing, its movement will be transmitted to the pawl 15 to turn the latter also in a clockwise direction, and thus the element 57 forms a motion transmitting means which transmits the motion of the slide 29 to the pawl 15. A wire spring 61 is coiled around the pivot 58 and engages the lug of the bell crank 59 as well as of the pawl 15 to urge these lugs toward each other, and as a result this arrangement makes it possible for the pawl 15 to turn relatively to the bell crank 57 during return of the ring 13 in the direction of the arrow 20 to its rest position where the diaphragm is fully open for viewing the subject. A spring 31 cooperates with the slide 29 to urge the latter downwardly to the illustrated rest position thereof where the stationary pins 33 are located at the top ends of the slots 32.

The slide 29 includes at its top end a rearwardly directed projection 28 and intermediate its ends a second rearwardly directed projection 46. The projection 46 at its rearmost end extends transversely toward the optical axis, and this projection 46 forms a control portion of the moving means and is in fact an important control member of the structure of the invention, since it is this element 46 which participates directly in the operation of the setting structure and in effect reads the results given by the setting structure so as to determine the proper aperture in accordance with the variables which are set into the setting structure.

The setting structure which is described below in effect forms a limiting means which limits the extent of movement of the moving means 29, 57, by limiting the extent to which the projection 46 can be moved upwardly during turning of the lever 35 by the operator. This limiting means limits the extent of movement of the projection 46 in accordance with the light received by a light meter of the camera as well as in accordance with the combination of the exposure time and film sensitivity set into the camera by the operator, so that by thus limiting the movement of the projection 46, the end position of the moving means 29, 57 is determined and in this way the angular position of the control means 15 is determined so as to determine in this way the particular aperture which is automatically provided with the structure of the invention.

The setting structure of the invention which forms the above limiting means includes a setting member 23 having a configuration which conforms to various amounts of light received by the camera. The camera includes an exposure meter having a honeycomb window 19 which receives the light, the light entering through the window 19 into the meter 17. For example, the meter 17 includes a photocell and in a conventional way a galvanometer is actuated so that the pointer 18 of the galvanometer will have an angular position determined by the amount of light which passes through the window 19. Because of the delicacy of the galvanometer, it is necessary to protect the pointer 18 thereof, and for this purpose the pointer 18 moves freely along the lower edges 22 of a pair of plates 21 which are fixed in the position illustrated in the drawing parallel to each other, and the plate 23 which forms one of the setting members of the invention is located in a plane which passes between the parallel plates 21, so that the plate 23 is freely movable into and out of the space between the plates 21. A plurality of rollers 25 which are supported for rotation about stationary axes cooperate with the edges of the plate 23 to guide the latter for movement in its own plane, and a spring 34 cooperates with the plate 23 to urge the latter upwardly as viewed in the drawing. The setting member 23 is provided along its upper periphery with a stepped edge 24, and in accordance with the particular angular position of the pointer 18, which is determined by the amount of light passing through the window 19, a particular step 24 will engage the pointer 18 so as to terminate the upward movement of the setting member 23. Thus, as a result of the cooperation of the stepped edge 24 and the pointer 18 the position to which the plate 23 is moved by the spring 34 will be in accordance with the amount of light received by the camera. Since the pointer 18 is protected by the lower edges of the plates 21, the bearing of a step 24 against the pointer 18 will not produce any stresses which are transmitted back into the delicate galvanometer structure, and therefore the galvanometer itself is not injured in any way and can continue to operate reliably in order to properly make each exposure.

It will be noted that the projection 28 extends over a pin 27 which is fixed to the plate 23. The spring 31 is stronger than the spring 34, so that when the parts are at rest the spring 31 will act on the slide 29 to cause the projection 28 to act on the pin 27 for retracting the setting member 23 to the position which is illustrated in the drawing, and since in this position the edge 24 is spaced from the pointer 18 the latter is free to turn to whichever position it takes in accordance with the light received by the exposure meter 17.

The setting member 23 is provided opposite the stepped edge 24 thereof with a stepped edge 45 which cooperates with a bell crank 42 in the manner described below in order to properly correlate the various values set into the setting mechanisms. It will be noted that the opposite side edges 26 of the plate 23 cooperate with rollers 25 at both sides of the plate 23 so that the latter is very precisely guided for movement in its own plane.

The bell crank 42 is supported for turning movement around the axis 40 which is perpendicular to the optical axis, and the pivot which supports the bell crank 42 may also serve as a shaft supporting one of the guide rollers 25 of the plate 23, as illustrated in the drawing. The bell crank 42 is provided at the bottom end of its arm 41 with a projection 39 in the path of turning movement of which the stepped edge 45 is located, so that the extent to which the bell crank 42 can be turned in a counterclockwise direction, as viewed in the drawing, is determined by the engagement of the projection 39 with a particular step of the stepped edge 45. Inasmuch as the position of the plate 23 will be determined by the position of the pointer 18, it is apparent that the particular step 45 engaged by the projection 39 will be determined by the amount of light received by the camera so that the extent of turning of the bell crank 42 introduces the factor of the amount of light received by the camera into the setting structure. The arm 43 of the bell crank 42 fixedly carries a pin 44 which is engaged by an arcuate edge 52 which extends along the circle whose center is in the pivot pin 49 shown at the lower part of the drawing. This pivot pin 49 is vertically movable along a guide slot 51, and the pivot pin 49 pivotally supports a lever 48 provided at its bottom end with a projection 60 connected to a spring 50 which urges the lever 48 in a clockwise direction, as viewed in the drawing. The lever 48 is provided intermediate its ends with a lug 54 located in a plane which is perpendicular to the optical axis, and a rounded free end 12 of the motion transmitting pin 11 engages the lug 54, so that in this way the spring 50 not only urges the lever 48 in a clockwise direction, as viewed in the drawing, but in addition it acts through the lug 54 on the pin 11 to maintain the latter at all times in engagement with the stepped edge 9.

The setting structure of the invention includes a second setting member 47 which forms a projection at the top end of the lever 48 and which is provided with the arcuate edge 52. The projection 47 has a configuration which conforms to various combinations of exposure time and film sensitivity set into the camera by the operator. Thus, it will be noticed that the projecting portion 47 of the lever 48 is of a somewhat wedge-shaped construction and becomes gradually wider as it becomes more distant from the top end of the lever 48, and furthermore it is provided with teeth 53 at its bottom edge. It is apparent that in accordance with the particular combination of exposure time and film sensitivity set into the camera, the pin 11 will have a given axial position and thus the lever 48 will have a given angular position, so that in this way a portion of the projection 47 of a given width will be located in vertical alignment with the pin 44 which is fixed to the bell crank 42. This pin 44 is located in the path along which the control projection 46 of the slide 29 moves, and thus the projecting portion 47 of the lever 48 is located also in the path of movement of the projecting portion 46. It is apparent that a wider or narrower part of the projecting portion 47 of the lever 48 will be engaged by the projection 46 depending upon the particular combination of the exposure time and film sensitivity set into the camera by the operator.

Thus, as the operator turns the lever 35 the slide 29 together with its control projection 46 will move upwardly, as viewed in the drawing, and this projecting portion 46 will engage the particular part of the projecting portion 47 which is in vertical alignment with the pin 44. Thereafter, the continued turning of the lever 35 by the operator will continue the upward movement of the slide 29 and projecting portion 46 thereof, and at this time the entire lever 48 will move upwardly with the pivot pin 49 moving upwardly along the slot 51 and of course the spring 50 will be tensioned to a greater degree at this time, but the cooperation of the teeth 53 with the projecting portion 46 will prevent any turning of the lever 48 during its upward movement. This upward movement of the lever 48 turns the bell crank 42 so that the projection 39 thereof approaches the stepped edge 45 of the setting member 23. Of course, as soon as the operator starts the upward movement of the slide 29, the projection 28 thereof moves upwardly to release the plate 23 to the spring 34 so that the plate 23 has already moved to a position determined by the pointer 18, and thus the stepped edge 45 is in a position determined by the amount of light received by the camera, so that when the lever 48 has moved upwardly to an extent which will place the projection 39 in engagement with one of the teeth 45, the particular position of the control member 46 and slide 29 will be determined on the one hand by the amount of light received by the camera and on the other hand by the exposure time and film sensitivity which have been set into the camera.

Of course, these movements of the slide 29 are transmitted through the above-described motion transmitting means 55, 57 to the pawl 15 so that the latter is turning during this time and will reach when projection 39 engages the edge 45 an angular position which will control the turning of the ring 13 to place the proper aperture into the camera.

It is apparent from the above description that with the structure of the invention the member 23 will be controlled by the light measuring means 17 so as to provide a first predetermined distance through which the control projection 46 is movable. This first predetermined distance is determined by the pin 44 which would be engaged directly by the projection 46 were it not for the projection 47 interposed between the pin 44 and the projection 46. Thus, if the setting member formed by the projection 47 were not present, the pin 46 could move all the way up to the pin 44 and turn the latter together with the bell crank 42 until the projection 39 engaged the stepped edge 45 so as to provide this first predetermined distance through which the projection 46 is movable. The setting structure of the invention, however, does not permit the projection 46 to move through the entire distance which would be permitted solely by the position of the member 23. Instead the distance through which the projection 46 can move is less than this first predetermined distance by a second predetermined distance which is determined by the particular width of the projecting portion 47 which is in vertical alignment with the pin 44 between the latter and the projection 46. Thus, the setting structure of the invention reduces the first distance of movement of the projection 46 provided by the position of the setting member 23 by a second predetermined distance determined by the angular position of the lever 48 which is of course determined by the combination of exposure time and film sensitivity set into the camera. Thus, the setting structure of the invention subtracts from the predetermined distance through which projection 46 is movable in accordance with the position of the plate 23 a predetermined distance determined by the combination of exposure time and film sensitivity set into the camera, and it is thus the difference between these two distances which determines the final position of the projection 46 and the setting of the diaphragm.

Of course, variations in the details of the above-described structure are possible. For example, instead of providing a manually movable member 35 for actuating the structure of the invention, it is possible to couple an element such as the member 35 to the shutter release plunger so that the above-described structure will operate in response to actuation of the shutter release to locate the diaphragm at the proper aperture position just prior to exposure.

While the invention has been illustrated and described as embodied in automatic control structure for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera having means for setting a selected exposure time into the camera, means for setting a selected film sensitivity into the camera, and means for measuring the light received by the camera, in combination, a control pawl for determining the diaphragm aperture of the camera; support means supporting said control pawl for turning movement around a predetermined axis, the angular position of said control pawl determining the diaphragm aperture; a diaphragm control member turnable about an axis parallel to that about which said pawl turns and having at its periphery a plurality of steps circumferentially distributed about the turning axis of said diaphragm control member and successively located at greater radial distances from said axis so that the diaphragm aperture will be determined by a particular step which engages said pawl; moving means cooperating with said control pawl for turning the latter, said moving means including a control portion which moves along a given path during turning of said control pawl; and mechanical limiting means automatically cooperating with said control portion to limit the movement thereof along said given path according to the amount of light received by the camera as well as according to the exposure time and film sensitivity set into the camera, so that said limiting means automatically stops the movement of said control portion of said moving means along said given path at a location which will place said control pawl in an angular position providing in cooperation with said diaphragm control member the proper diaphragm aperture.

2. A setting mechanism adapted to be used in a camera for setting the diaphragm aperture according to the amount of light received by the camera and according to the combination of exposure time and film sensitivity set into the camera, said setting mechanism comprising, in combination, a first setting member having a configuration conforming to different combinations of exposure time and film sensitivity; a second setting member having a configuration conforming to various amounts of light received by the camera; light measuring means cooperating with said second setting member for determining the position of the latter in the camera; motion transmitting means cooperating with said first setting member for transmitting to the latter the combination of exposure time and film sensitivity set into the camera by the operator; a control member movable along a given path, said first setting member being located in the path of movement of said control member and being positioned by said motion transmitting means at a location placing in the path of movement of said control member a portion of said first setting member whose dimension reflects the combination of exposure time and film sensitivity set into the camera; and a limiting member limited in its movement by the position of said second setting member and located in the path of movement of said first setting member after the latter is engaged and moved by said control member during movement of the latter along said given path to be moved by said first setting member until said limiting member is stopped in its movement by said second setting member so that the final position of said limiting member reflects the light received by the camera, whereby the final position of said control member will reflect the amount of light received by the camera as well as the film sensitivity and exposure time set into the camera and may be used in order to determine a proper adjustment for the diaphragm.

3. In a camera, in combination, an exposure meter having a pointer whose position is determined by the amount of light received by the exposure meter; a first setting member movable toward and away from said pointer and having a stepped edge directed toward said pointer so that the extent of movement of said first setting member toward said pointer will be determined by the position of the pointer; spring means urging said first setting member toward said pointer, said first setting member having opposite said stepped edge thereof a second stepped edge; a bell crank having at one end a projection in whose path of turning said second stepped edge is located so that said second stepped edge of said first setting member will determine the final angular position of said bell crank in accordance with the position of said first setting member determined by the position of the pointer of said exposure meter; a second setting member engaging said bell crank at an oposite end thereof for turning said bell crank into engagement with said first setting member during movement of said second setting member along a given path, said second setting member having a portion whose configuration conforms to various combinations of exposure time and film sensitivity; means for placing in engagement with said bell crank a part of said second setting member which conforms to the particular combination of film sensitivity and exposure time set into the camera; and moving means movable along a given path and having a portion engaging said second setting member and moving the latter along said given path to turn said bell crank into engagement with said first setting member, so that the final position of said moving means determined by said first and second setting members and the bell crank will give a setting capacle of being used for determining the diaphragm aperture.

4. In a camera, in combination, an exposure meter having a pointer whose position is determined by the amount of light received by the exposure meter; a plate supported for movement toward and away from said pointer and having a first stepped edge adapted to engage the pointer and an opposite stepped edge distant from said first stepped edge; a bell crank having at one end a projection in whose path of turning said opposite stepped edge of said plate is located so that said opposite stepped edge limits the extent to which the bell crank can turn; a lever having an elongated projecting portion engaging said bell crank at an opposite end of the latter, said projecting portion of said lever being of tapered configuration so that depending upon the angular position of said lever portions of said projecting portion of different widths will engage said bell crank to turn the latter; means for turning said lever to a position locating in engagement with said bell crank a portion of said projecting portion of said lever whose width conforms to the combination of exposure time and film sensitivity set into the camera, said lever being movable along a given path to turn said bell crank until the latter engages said opposite stepped edge of said plate; and moving means also movable along said path and engaging said projecting portion of said lever to move the latter along said path to turn said bell crank into engagement with said plate, so that the final position of said moving means determined by the engagement of said bell crank with said plate will reflect the combination of light received by the camera as well as the film sensitivity and exposure time set into the camera to enable the final position of the moving means to be used for determining the aperture of the diaphragm.

5. In a camera, in combination, an exposure meter having a pointer whose position is determined by the amount of light received by the exposure meter; a plate supported for movement toward and away from said pointer and having a first stepped edge adapted to engage the pointer and an opposite stepped edge distant from said first stepped edge; a bell crank having at one end a projection in whose path of turning said opposite stepped edge of said plate is located so that said opposite stepped edge limits the extent to which the bell crank can turn; a lever having an elongated projecting portion engaging said bell crank at an opposite end of the latter, said projecting portion of said lever being of tapered configuration so that depending upon the angular position of said lever portions of said projecting portion of different widths will engage said bell crank to turn the latter; means for turning said lever to a position locating in engagement with said bell crank a portion of said projecting portion of said lever whose width conforms to the combination of exposure time and film sensitivity set into the camera, said lever being movable along a given path to turn said bell crank until the latter engages said opposite stepped edge of said plate; and moving means also movable along said path and engaging said projecting portion of said lever to move the latter along said path to turn said bell crank into engagement with said plate, so that the final position of said moving means determined by the engagement of said bell crank with said plate will reflect the combination of light received by the camera as well as the firm sensitivity and exposure time set into the camera to enable the final position of the moving means to be used for determining the aperture of the diaphragm, said moving means being manually operable.

6. In a camera, in combination, an exposure meter having a pointer whose position is determined by the amount of light received by the exposure meter; a plate supported for movement toward and away from said pointer and having a first stepped edge adapted to engage the pointer and an opposite stepped edge distant from said first stepped edge; a bell crank having at one end a projection in whose path of turning said opposite stepped edge of said plate is located so that said opposite stepped edge limits the extent to which the bell crank can turn; a lever having an elongated projecting portion engaging said bell crank at an opposite end of the latter, said projecting portion of said lever being of tapered configuration so that depending upon the angular position of said lever portions of said projecting portion of different widths will engage said bell crank to turn the latter; means for turning said lever to a position locating in engagement with said bell crank a portion of said projecting portion of said lever whose width conforms to the combination of exposure time and film sensitivity set into the camera, said lever being movable along a given path to turn said bell crank until the latter engages said opposite stepped edge of said plate; and moving means also movable along said path and engaging said projecting portion of said lever to move the latter along said path to turn said bell crank into engagement with said plate, so that the final position of said moving means determined by the engagement of said bell crank with said plate will reflect the combination of light received by the camera as well as the film sensitivity and exposure time set into the camera to enable the final position of the moving means to be used for determining the aperture of the diaphragm, said means for determining the angular position of said lever including a pair of manually turnable rings having with respect to each other an angular position determined by the film sensitivity and both of said rings having together an angular position determined by the exposure time set into the camera, one of said rings having a stepped edge engaging an elongated motion transmitting pin which in turn engages said lever to turn the latter to an angular position determined by the portion of the latter stepped edge which engages the pin for placing said lever in a position determined by the combination of the exposure time and film sensitivity set into the camera.

References Cited in the file of this patent

UNITED STATES PATENTS

| Re. 21,034 | Karg _____ Mar. 21, 1939 |
| | (Original No. 2,061,909) |
| 1,974,433 | Riszdorfer _____ Sept. 25, 1934 |
| 2,148,963 | Rauch _____ Feb. 28, 1939 |
| 2,780,971 | Fahlenberg _____ Feb. 12, 1957 |